UNITED STATES PATENT OFFICE.

GERHARD STALMANN, OF LEIPZIG-GOHLIS, GERMANY, ASSIGNOR TO THE FIRM OF SCHIMMEL U. CO., OF MILTITZ-LEIPZIG, GERMANY.

PROCESS OF MANUFACTURING PROTOCATECHUIC ALDEHYDE.

No. 886,085.　　　Specification of Letters Patent.　　Patented April 28, 1908.

Application filed October 5, 1905. Serial No. 281,525.

*To all whom it may concern:*

Be it known that I, GERHARD STALMANN, doctor of philosophy, chemist, a subject of the King of Prussia, German Emperor, residing at 20 Bismarckstrasse, Leipzig-Gohlis, Kingdom of Saxony, German Empire, have invented new and useful Improvements in Processes of Manufacturing Protocatechuic Aldehyde, of which the following is a specification.

The present process is based upon the observation that the halogen compounds of sulfur, especially the chlorids, such for example as protochlorid of sulfur $S_2Cl_2$ and dichlorid of sulfur $SCl_2$ are particularly adapted for converting piperonal into the halogen compounds of piperonal. The action of halogen compounds of sulfur on piperonal is different from that of pentachlorid of phosphorus. Contrary to the action of pentachlorid of phosphorus, it is not the aldehyde group but only the methylene group that is halogenized. The result of the action of sulfur halogenized is that mainly dichloropiperonal is obtained, whereas with phosphorus pentachlorid firstly piperonal chlorid and later on dichloropiperonal chlorid are formed. The reaction may be expressed by the following equation:

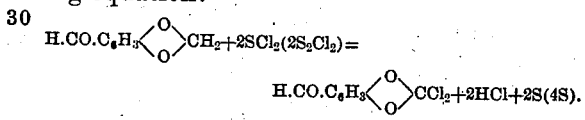

Upon boiling with water the produced chlorinized methylene ether, the dichloropiperonal is decomposed into protocatechuic aldehyde, hydrochloric acid, and carbonic acid:

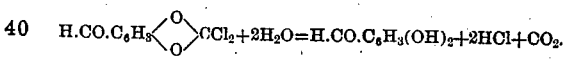

It is not necessary to employ ready prepared chlorid of sulfur, as halogen sulfur may be allowed to form during the action on piperonal. For example chlorin may be introduced into a mixture of piperonal with sulfur, heated to say 130°, until the skilled workman will see the termination of the reaction and thereupon, the reaction-product may be decomposed as above by boiling with water. Or bromin may be allowed to drop into a mixture of piperonal and sulfur heated to about 130°, Cent. or bromin vapor may be introduced into the mixture, decomposition being then effected by boiling with water.

In place of the halogen compounds of sulfur, sulfuryl chlorid may also be used. This compound also likewise does not chlorinize the aldehyde group, but only the methylene group in the sense of the following equation:

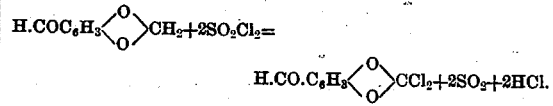

With the same success as piperonal, chlorid of piperonal

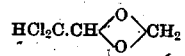

may also be converted into dichloro-piperonal chlorid by my process, and this may be broken down in the known manner into protocatechuic aldehyde, hydrochloric acid, and carbonic acid.

In order to describe my process more fully, I give the following examples as illustrations for carrying out my process:

I. 15.4 kilograms of piperonal are heated with 26.8 kilograms of protochlorid of sulfur to about 130° Cent. As soon as the initially somewhat vigorous generation of hydrochloric acid is ended, the mixture is submitted to a boiling with water for about 8 hours, a uniform stream of carbonic acid escaping during this time. After the evolution of carbonic acid is finished, it is filtered from the sulfur separated and the protocatechuic aldehyde is extracted from the aqueous solution with ether.

II. 15.4 kilograms of piperonal are heated with 26.8 kilograms of sulfuryl chlorid to about 80°. After the reaction (which takes place somewhat impetuously) is finished, the product is boiled with water and after cooling the protocatechuic aldehyde is extracted with ether.

III. 22.2 kilograms of piperonal chlorid are treated with 20.4 kilograms of dichlorid of sulfur as in Example I, but with the addition of 8 kilograms of toluene. After the reaction-product has been decomposed by treating with water, the toluene is blown off with steam and the protocatechuic aldehyde is isolated as above.

IV. Into a mixture of 15.4 kilograms of piperonal and about 5 kilograms of sulfur, heated to say 130° Cent., 14 kilograms of chlorin are gradually introduced. Thereupon the mixture is heated until the generation of hydrochloric acid is finished, when the reaction product is treated as in the above examples.

What I claim as my invention and desire to secure by Letters-Patent is:—

1. The process for manufacturing protocatechuic aldehyde which consists in heating piperonal with halogen compounds of sulfur and boiling the product formed with water.

2. The process for manufacturing protocatechuic aldehyde which consists in heating piperonal with halogen compounds of sulfur and solvents and boiling the product formed with water.

3. The process for manufacturing protocatechuic aldehyde which consists in heating piperonal with sulfur and introducing a halogen into the mixture and boiling the product formed with water.

4. The process for manufacturing protocatechuic aldehyde which consists in heating piperonal with sulfur and solvents and introducing a halogen into the mixture and boiling the product formed with water.

In testimony whereof I have signed my name to this specification in the presence of two subscribing witnesses.

GERHARD STALMANN.

Witnesses:
ERNST FRITZSCHE,
RUDOLPH FRICKE.